Sept. 8, 1942.   E. G. HATHAWAY   2,294,982
SHANK STIFFENER
Filed March 31, 1941
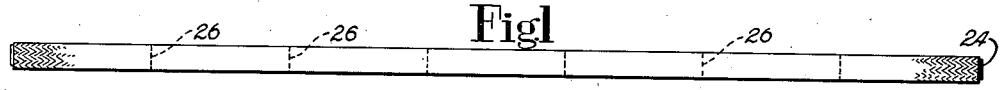
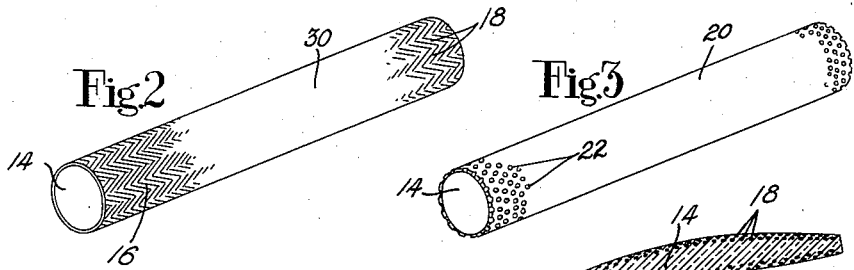
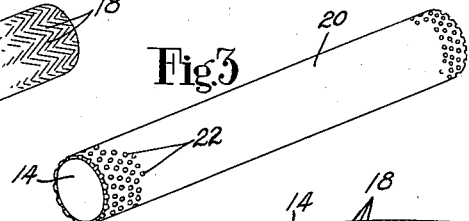
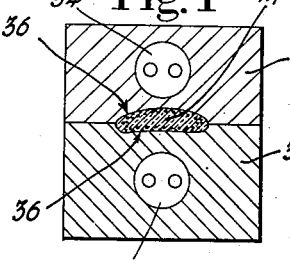
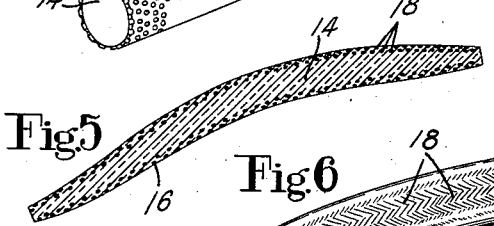
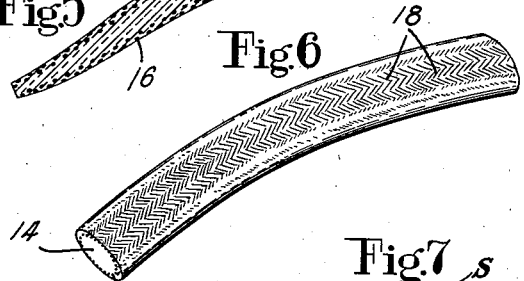
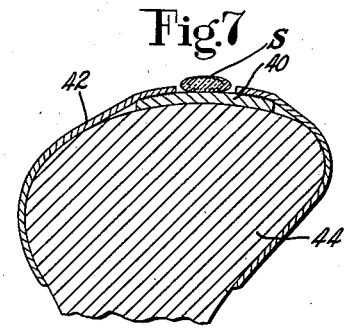
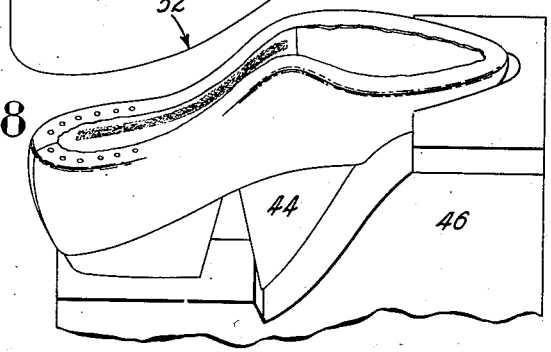
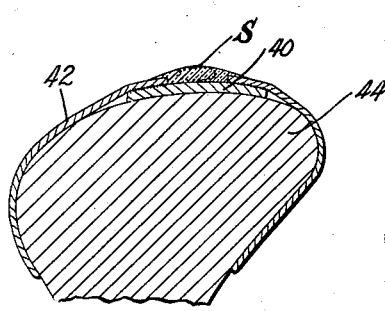
INVENTOR
Everett G. Hathaway
By his attorney Patented Sept. 8, 1942

2,294,982

UNITED STATES PATENT OFFICE 2,294,982

SHANK STIFFENER

Everett G. Hathaway, Salem, Mass., assignor to United Shoe Machinery Corporation, Flemington, N. J., a corporation of New Jersey Application March 31, 1941, Serial No. 386,005

11 Claims. (Cl. 36—76)

This invention relates to improvements in shank stiffeners.

Shank stiffeners are customarily made of metal or wood or of those materials in combination with filler pieces of leather, fiberboard, or the like and it has been necessary to make them in a large variety of sizes and shapes and more particularly to provide a wide range of longitudinal curvatures adapting them for use in shoes to which heels of a plurality of different heights are to be applied and the bottoms of which, accordingly, are curved to varying degrees in their shank portions. The necessity of furnishing a large number of different sizes and styles of shank stiffeners adds substantially to the expense of shoe manufacture. Furthermore, conventional shank stiffeners are unsatisfactory from various standpoints. Much care is required to locate them properly in the shoes and it is difficult to secure them firmly and permanently in place. Even if they are properly located and securely attached they may not accurately fit the curve or arch of the shoe bottom. Usually, also, it is necessary to employ plastic filling materials of some sort to fill in the cavities in the shoe bottom along the opposite sides of the stiffener.

Objects of the present invention are to reduce the expenses incident to the manufacture of shank stiffeners and the application of the stiffeners to shoes, to provide for more effective reinforcing or stiffening of the shank portions of shoes, to provide shank stiffeners which will render unnecessary the use of any filling material other than the shank stiffener itself in the shank and heel-seat portions of the shoe bottom.

With these objects in view the invention consists in the novel features of shank stiffener construction hereinafter described and claimed.

The invention will be explained with reference to the accompanying drawing, in which Fig. 1 is a plan view of a rod of hardened plastic material encased in a tubular braided wire covering, the view illustrating the manner in which the rod is cut into small pieces or blanks from which shank stiffeners are to be formed;

Fig. 2 is a perspective view of one of the shank stiffener blanks formed by cutting the rod shown in Fig. 1;

Fig. 3 is a perspective view of a shank stiffener blank having a covering of modified construction;

Fig. 4 is a cross-sectional view of my improved shank stiffener illustrating the performance of a molding operation thereon;

Fig. 5 is a longitudinal sectional view of the shank stiffener as it appears after having been molded;

Fig. 6 is a perspective view of the shank stiffener;

Fig. 7 is a cross-sectional view of a lasted shoe as it appears after my improved shank stiffener has been assembled therewith;

Fig. 8 is a perspective view illustrating a molding operation which may be performed upon the bottom of a lasted shoe for the purpose of giving the shank stiffener its final shape; and Fig. 9 is a cross-sectional view of the shoe as it appears at the completion of the molding operation illustrated in Fig. 8.

In Fig. 2 of the drawing I have shown a shank stiffener blank comprising solid body 14 of hardened plastic material encased in a foraminous metallic covering 16 which serves effectively to reinforce the body material. As shown, the body 14 is in the form of a cylindrical bar and the covering 16 consists of a tube of intermeshed wire strands 18 which closely encase the body throughout the length of the latter. The body 14 may be composed of any suitable plastic substance which, in its normal hardened state, is stiff, strong and resilient and adapted permanently to retain its shape but which is capable of being readily molded when softened by heat or by a suitable solvent. I prefer, however, to make the body of the stiffener of thermoplastic material, for example, a thermoplastic synthetic resin, such as ethyl cellulose. It will be understood that various commercial types of thermoplastic synthetic resins may be used for this purpose. The wire strands 18 may be loosely braided, as shown, or they may be interwoven or otherwise intermeshed so that the interstices between the strands will provide a multiplicity of foramina or very small apertures or openings similar to the openings in a sieve into and through which the plastic body material may be forced while it is in a softened condition and the stiffener is being subjected to molding pressure. Instead of employing braided or woven wire for covering the body portions of the shank stiffeners the covering may consist of a perforated tubular casing 20 of thin sheet metal, the casing, as shown in Fig. 3, having a great many small apertures 22 therein which are close together and uniformly distributed so that the casing is sieve-like in character.

The plastic material employed in making the shank stiffener blanks may be furnished in the form of long, cylindrical rods, such as the rod 24 shown in Fig. 1, the rod being of such a length that a plurality of stiffeners may be formed by merely cutting through the rod at spaced locations, as indicated by the dotted lines 26. The pieces thus produced are softened and shaped by a bending or molding operation to adapt them for application to a shoe. Advantageously the wire mesh fabric or other material which is to constitute the shank stiffener coverings may be applied to the rods 24 before the rods are cut into pieces. The rods may be covered by braiding or weaving strands of wire directly upon them or the rods may be thrust endwise into tubes previously fabricated from wire strands, or, if perforated sheet metal is to be employed as the covering, it may be merely wrapped around the rods.

Shank stiffener blanks such as those above described may be softened sufficiently by means of heat or by the use of a solvent before the stiffener is applied to a shoe so that the act of laying or pressing the stiffener against the shoe will shape it approximately to the longitudinal curvature of the shoe bottom. I prefer, however, to mold the stiffeners to impart a predetermined amount of longitudinal curvature thereto before applying them to the shoe and at the same time to substantially reduce the stiffeners in thickness and widen them considerably so that they will more nearly approximate the cross-sectional shape of a conventional shank stiffener. It is to be noted that the wire mesh covering will in no wise interfere with this molding or shaping of the stiffener inasmuch as the tubular covering will readily collapse as required under the molding pressure. Preferably the stiffeners, after they have been thus molded, will be somewhat thicker than conventional stiffeners to allow for some reduction in thickness as a result of a subsequent molding operation which is to shape them exactly to the bottom contour of the particular shoes with which they are to be used.

The above-described molding of the shank stiffener blanks may be accomplished by the use of upper and lower molds or forms 30 and 32 respectively (Fig. 4) to which heat may be applied by means of electrical heating units 34. The molds 30 and 32 have cooperating molding surfaces 36 which are shaped to produce stiffeners of the desired cross-sectional and longitudinal curvatures. I prefer to shape the stiffeners so that they will have a contour that is generally elliptical in cross-section, as that shown in Fig. 4. The heat from the molds will soften the thermoplastic body portion of the stiffener so that not only will the stiffener be readily molded to the desired shape but the softened thermoplastic material will be forced into, and, to a certain extent at least, extruded through the interstices between the loosely braided strands of the wire covering 16, or into and through the perforations 22 in the sheet metal covering 20, as the case may be, so that the covering will become embedded in the softened material, thus adapting the covering to function effectively to strengthen and reinforce the plastic material against any tendency to break under the influence of stresses to which the stiffener may be subjected in the shoe. As shown in Fig. 5, the strands 18 of the wire fabric are embedded at the upper and lower sides of the stiffeners so that the covering is substantially flush with the surfaces of the thermoplastic body material 14. By reference to Fig. 4 it will be seen that the plastic body material has been extruded through the openings in the opposite lateral edge portions of the partially collapsed tubular covering so that it extends somewhat beyond those edges. The shank stiffeners are made long enough to extend along the shank and into the heel-seat portions of the shoes in which they are to be used. Probably it will be sufficient to provide no more than three different lengths of stiffeners for use in shoes comprising a complete run of sizes and styles. It may be desirable to furnish shank stiffeners having different amounts of longitudinal curvature for use in shoes which are to have heels of different heights but probably it will be necessary to provide for no more than three different degrees of longitudinal curvature in the shank stiffeners to take care of such shoes.

A shank stiffener made as above described will have a predetermined amount of longitudinal curvature imparted to it and, while it will thus be adapted for application to a shoe the bottom of which has just that amount of longitudinal curvature, it will be adapted to fit only approximately if applied to the bottom of a shoe having a different amount of longitudinal curvature. Consequently, I contemplate that shank stiffeners molded as already described may advantageously be made by shank manufacturers and sold to shoe manufacturers who will subject each shank stiffener to a further molding operation by which it will be shaped exactly in conformity with the bottom contour of the particular shoe to which it is to be applied. This second molding operation may be accomplished by the use of any appropriate molding device but preferably the shank stiffener will be positioned upon the shoe in which it is to be incorporated before this second molding is effected, so that the shoe bottom itself will serve as a molding form for the upper or bottom-facing side of the shank stiffener.

In carrying out this preferred method of producing the final molded shape of the shank stiffener, the stiffener S is positioned, as shown in Fig. 7, upon the insole 40 of a lasted shoe and within the cavity between the edges of an upper 42, the marginal portions of which have been secured in overlasted position upon the insole. The shoe, which is on a last 44, may then be placed upon a support or jack 46 (Fig. 8) and a heated metallic form or mold 48 (to which the heat may be applied by means of electrical heating units 50) is employed to perform a second and final molding operation upon the stiffener. The form 48 has a smooth lower molding surface 52 substantially complemental to the shank and heel-seat portions of the last bottom and as the form is lowered into engagement with the shank stiffener heavy pressure is applied to the form by means such as the presser member 54. Under the influence of the heat and molding pressure the thermoplastic material of the shank stiffener will be again softened, and the entire stiffener will be further reduced in thickness and it may be widened quite substantially, the soft plastic material being extruded through the openings in the opposite sides of the foraminous tubular reinforcing element 14 until it completely fills the bottom cavity inwardly of the overlasted margins of the upper 42. The soft plastic material may even be caused to overflow more or less the inner portions of the upper margins, as shown in Fig. 7. As also shown in this figure, the upper surface of the shank stiffener material will have a desired convexity imparted thereto corresponding to or in excess of that of the last bottom and the stiffener will be conformed accurately throughout its length to the longitudinal curvature of the last bottom. The stiffener, moreover, will present a continuous smooth outer surface for receiving an outsole (not shown) which will subsequently be laid and attached to the shoe. It will be seen in Fig. 9 that the plastic body material of the shank stiffener also entirely fills the bottom cavity in the heel-seat portion of the shoe. If the outsole is to be attached by means of cement, the surface of the thermoplastic shank stiffener material, after the latter has become hardened, will insure the obtaining of a satisfactory bond between the outsole and the shoe bottom in the shank and heel-seat portions of the latter. Moreover, these portions of the shoe bottom will have been stiffened much more effectively than if a conventional metallic or wooden shank stiffener had been employed and the contour or firmness of these portions of the shoe bottom will be permanently retained. The tubular element 16 which is embedded within the plastic body of the molded heel and shank piece will reinforce the latter so that it will effectively withstand all strains resulting from the wearing of the shoe and thus insure against breakage of the plastic stiffening material.

Having described my invention, what I claim as new and desire to secure by Letters Patent of the United States is:

1. A shank stiffener comprising a solid body of plastic material encased in a tubular metallic covering.

2. A shank stiffener comprising a solid body of hardened plastic material encased in a foraminous covering of reinforcing material.

3. A shank stiffener comprising a strip of hardened thermoplastic material having a foraminous metallic covering thereon.

4. A shank stiffener comprising a resilient bar of hardened plastic material having a covering of wire mesh fabric thereon.

5. A shank stiffener comprising a solid body of hardened plastic material having a foraminous tubular reinforcing member embedded therein with its outer surface substantially flush with that of said body.

6. A shank stiffener comprising a strip of hardened plastic material having a foraminous reinforcing tube in a partially collapsed form extending lengthwise of said strip, the material of said strip filling the interior of said tube and the foramina therein.

7. A shank stiffener comprising a solid resilient strip of hardened plastic material having a metallic reinforcing element embedded therein, said reinforcing element being substantially coextensive with said strip both lengthwise and widthwise thereof and having a multiplicity of minute apertures spaced with substantial uniformity throughout its length and width and filled with said plastic material.

8. A shank stiffener comprising a resilient mass of hardened plastic material having a multiplicity of intermeshed wire strands embedded therein for reinforcing purposes.

9. A shank stiffener comprising a body of hardened plastic material encased within a perforated metallic covering.

10. A shank stiffener comprising a mass of hardened plastic material, and a reinforcing tube of wire fabric extending lengthwise of the stiffener and embedded in said plastic material.

11. A shank stiffener comprising a partially collapsed metallic tube having a multitude of small openings therein, and a mass of hardened plastic material filling the interior of said tube and the openings therein.

EVERETT G. HATHAWAY.